United States Patent
Yi

(10) Patent No.: US 9,459,491 B2
(45) Date of Patent: Oct. 4, 2016

(54) MIRROR DISPLAY DEVICE AND MANUFACTURING METHOD THEREOF

(71) Applicant: Samsung Display Co., Ltd., Yongin-si, Gyeonggi-do (KR)

(72) Inventor: Jung Hwan Yi, Yongin-si (KR)

(73) Assignee: Samsung Display Co., Ltd. (KR)

( * ) Notice: Subject to any disclaimer, the term of this patent is extended or adjusted under 35 U.S.C. 154(b) by 143 days.

(21) Appl. No.: 14/457,775

(22) Filed: Aug. 12, 2014

(65) Prior Publication Data

US 2015/0227001 A1    Aug. 13, 2015

(30) Foreign Application Priority Data

Feb. 10, 2014    (KR) ........................ 10-2014-0014924

(51) Int. Cl.
```
G02F 1/13      (2006.01)
G02F 1/1335    (2006.01)
G02F 1/1333    (2006.01)
G02F 1/1347    (2006.01)
```
(52) U.S. Cl.
CPC ..... G02F 1/133536 (2013.01); G02F 1/13471 (2013.01); G02F 1/133377 (2013.01); G02F 1/133553 (2013.01)

(58) Field of Classification Search
CPC .................. G02F 1/133536; G02F 1/133377; G02F 1/133528; G02F 1/133526
See application file for complete search history.

(56) References Cited

U.S. PATENT DOCUMENTS

| | | | |
|---|---|---|---|
| 7,495,719 B2 | 2/2009 | Adachi et al. | |
| 7,728,927 B2 | 6/2010 | Nieuwkerk et al. | |
| 2001/0022997 A1* | 9/2001 | Honda | G02B 5/3016 428/1.31 |
| 2004/0189907 A1* | 9/2004 | Tominaga | G02F 1/133528 349/115 |
| 2011/0273659 A1 | 11/2011 | Sobecki | |
| 2015/0042896 A1* | 2/2015 | Lee | G02F 1/1347 348/790 |
| 2015/0177563 A1* | 6/2015 | Cho | G02F 1/133536 349/96 |
| 2015/0219911 A1* | 8/2015 | Cho | H04N 13/0404 349/15 |

FOREIGN PATENT DOCUMENTS

| | | |
|---|---|---|
| JP | 2005-321717 | 11/2005 |
| KR | 1020120026880 A | 3/2012 |
| KR | 1020120074499 A | 7/2012 |
| KR | 1020130104862 A | 9/2013 |
| KR | 1020130107379 A | 10/2013 |
| KR | 1020130107952 A | 10/2013 |

\* cited by examiner

*Primary Examiner* — Mariceli Santiago
(74) *Attorney, Agent, or Firm* — Innovation Counsel LLP

(57) ABSTRACT

A display device includes a display panel and a polarization conversion panel facing the display panel. The polarization conversion panel includes: an insulation substrate; an absorptive polarizer positioned on the insulation substrate; a first electrode positioned on the absorptive polarizer; a passivation layer formed on the first electrode while being spaced apart therefrom a microcavity interposed between the passivation layer and the first electrode, the passivation layer an injection hole; an overcoat formed on the passivation layer to cover the injection hole and seal the microcavity; a second electrode positioned on the overcoat; a reflective polarizer positioned on the second electrode; and a liquid crystal layer positioned in the microcavity.

8 Claims, 14 Drawing Sheets

MIRROR DISPLAY DEVICE AND MANUFACTURING METHOD THEREOF

CROSS-REFERENCE TO RELATED APPLICATION

This application claims priority to and the benefit of Korean Patent Application No. 10-2014-0014924 filed in the Korean Intellectual Property Office on Feb. 10, 2014, the entire contents of which are incorporated herein by reference.

BACKGROUND (a) Field

The present invention relates to a mirror display device and a manufacturing method thereof.

(b) Description of the Related Art

A liquid crystal display is currently one of the most widely used flat panel displays, and includes two display panels on which electric field generating electrodes such as a pixel electrode and a common electrode are formed, and a liquid crystal layer interposed between the two display panels. The liquid crystal display displays an image by generating an electric field on a liquid crystal layer by applying a voltage to the field generating electrodes, determining alignment directions of liquid crystal molecules of the liquid crystal layer through the generated field, and controlling polarization of incident light.

The two display panels forming the liquid crystal display may include a thin film transistor array panel and an opposing display panel.

In the thin film transistor array panel, a gate line for transmitting a gate signal and a data line for transmitting a data signal are formed to cross each other, and a thin film transistor connected to the gate and the data lines, a pixel electrode connected to the thin film transistor, etc. may be formed.

The opposing display panel may be formed with a light blocking member, a color filter, a common electrode, etc.

Alternatively, the light blocking member, the color filter, and the common electrode may be formed on the thin film transistor array panel.

However, in a liquid crystal display in the related art, two sheets of substrates are inevitably used, and respective constituent elements are formed on the two sheets of substrates, and as a result, the display device becomes heavy and thick, incurs a high cost, and requires a longer processing time.

Meanwhile, personal hand-held terminals or liquid crystal displays for outdoor display purposes basically have a portable size to meet a user's need, and liquid crystal displays including an additional mirror function have recently been provided.

The above information disclosed in this Background section is only for enhancement of understanding of the background of the disclosure and therefore it may contain information that does not form the prior art that is already known to a person of ordinary skill in the art.

SUMMARY

A display device and a manufacturing method thereof that are capable of reducing weight, thickness, cost, and processing time by using a single substrate when manufacturing the display panel are provided.

In addition, a display device that is capable of implementing a mirror mode in addition to a display mode is provided.

A display device includes a display panel and a polarization conversion panel facing the display panel. The polarization conversion panel includes: an insulation substrate; an absorptive polarizer positioned on the insulation substrate; a first electrode positioned on the absorptive polarizer; a passivation layer formed on the first electrode while being spaced apart therefrom and a microcavity interposed between the passivation layer and the first electrode, the passivation layer an injection hole; an overcoat formed on the passivation layer to cover the injection hole and seal the microcavity; a second electrode positioned on the overcoat; a reflective polarizer positioned on the second electrode; and a liquid crystal layer positioned in the microcavity.

The display panel may contact the reflective polarizer.

The first and second electrodes may be made of a transparent conductive oxide (TCO).

A first polarizer positioned between the display panel and the reflective polarizer may be further included, and transmissive axes of the first polarizer and the reflective polarizer may coincide with each other.

The transmissive axis of the reflective polarizer may be perpendicular to a transmissive axis of the absorptive polarizer.

A reflective axis of the reflective polarizer may be parallel to the transmissive axis of the absorptive polarizer.

The transmissive and reflective axes of the reflective polarizer may be perpendicular to each other.

The display panel may include: a substrate including a plurality of pixel areas that are arranged in a matrix form including a plurality of pixel rows and pixel columns; a thin film transistor formed on the substrate; a pixel electrode formed in the pixel area while being connected to the thin film transistor; a roof layer formed on the pixel electrode while being spaced apart therefrom and interposing a display microcavity therebetween; a liquid crystal layer filling the display microcavity; and an overcoat formed on the roof layer to cover the first injection hole and seal the display microcavity.

A manufacturing method of a display device includes: preparing a display panel; forming a first electrode on a surface of a separate insulation substrate; forming a sacrificial layer on the first electrode; forming a passivation layer on the sacrificial layer; forming an injection hole by etching the passivation layer such that the sacrificial layer is partially exposed; forming a microcavity between the passivation layer and the first electrode by removing the sacrificial layer; forming a liquid crystal layer by injecting a liquid crystal material through the injection hole; sealing the microcavity by forming an overcoat on the passivation layer; forming a second electrode on the overcoat; positioning a reflective polarizer on the second electrode; and positioning an absorptive polarizer on the other side of the insulation substrate.

The preparing of the display panel may include: forming a thin film transistor on a substrate including a plurality of pixel areas that are arranged in a matrix form including a plurality of pixel rows and pixel columns; forming a pixel electrode that is connected to the thin film transistor in the pixel area; forming a sacrificial layer, which is connected along the pixel column, on the pixel electrode; forming a roof layer on the sacrificial layer; forming a first injection hole by patterning the roof layer such that the sacrificial layer is partially exposed; forming a display microcavity between the pixel electrode and the roof layer by removing the sacrificial layer; forming a liquid crystal layer by injecting a liquid crystal material through the first injection hole; and sealing the display microcavity by forming an overcoat on the roof layer.

The method may further include combining the display panel and the reflective polarizers such that they contact each other.

The first and second electrodes may be made of a transparent conductive oxide (TCO).

The method may further include forming a first polarizer between the display panel and the reflective polarizer, wherein transmissive axes of the first polarizer and the reflective polarizer may coincide with each other.

The transmissive axis of the reflective polarizer may be perpendicular to a transmissive axis of the absorptive polarizer.

A reflective axis of the reflective polarizer may be parallel to the transmissive axis of the absorptive polarizer.

The transmissive and reflective axes of the reflective polarizer may be perpendicular to each other.

According to the display device and the manufacturing method thereof, the weight, thickness, cost, and processing time can be reduced by using the single substrate in manufacturing the display panel.

In addition, through the display device implementing a mirror mode and the manufacturing method thereof, convenience may be provided for the user.

DETAILED DESCRIPTION OF THE EMBODIMENTS

Figure 1:
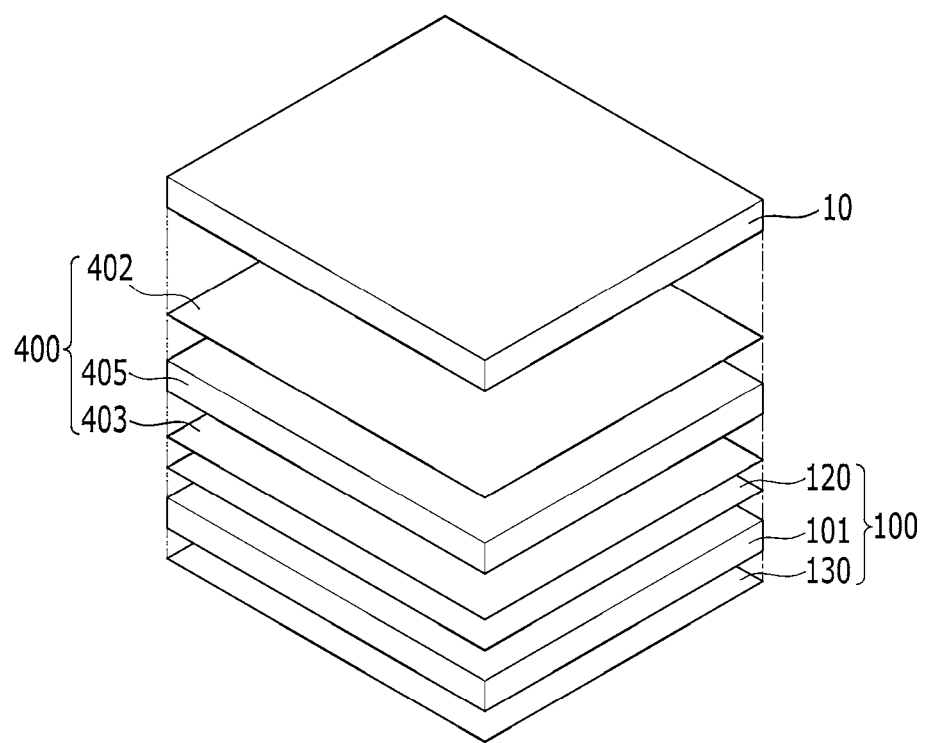
FIG. 1 is a perspective view of a display device according to an example embodiment.

The present disclosure will be described more fully hereinafter with reference to the accompanying drawings, in which example embodiments are shown.

As those skilled in the art would realize, the described embodiments may be modified in various different ways, all without departing from the spirit or scope of the present invention.

In the drawings, the thickness of layers, films, panels, regions, etc. are exaggerated for clarity.

Like reference numerals designate like elements throughout the specification.

It will be understood that when an element such as a layer, film, region, or substrate is referred to as being "on" another element, it can be directly on the other element, or intervening elements may also be present.

In contrast, when an element is referred to as being "directly on" another element, there are no intervening elements present.

A display device according to an example embodiment will now be described with reference to FIGS. 1 and 2.

Figure 2A:
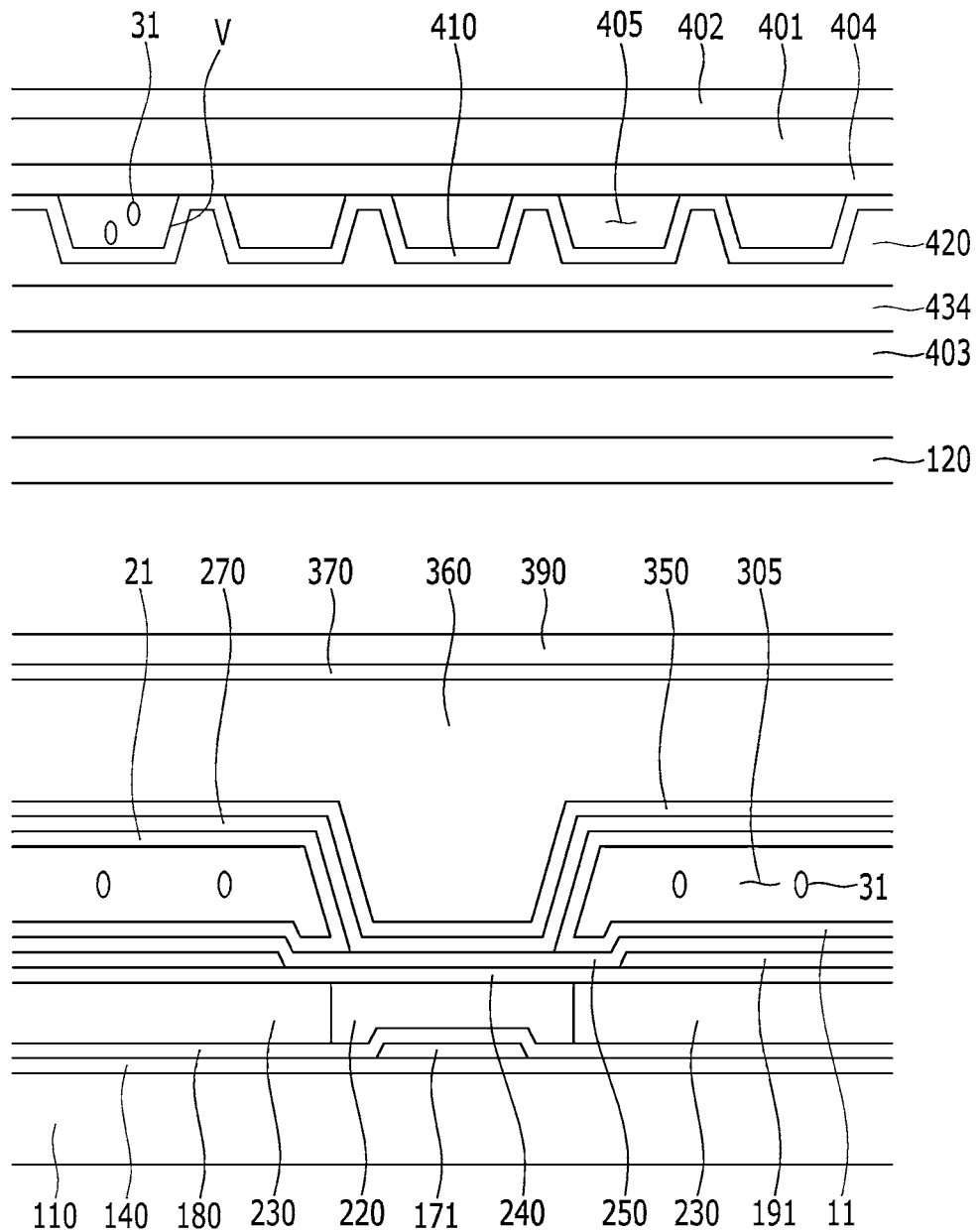
FIG. 2A is a partial cross-sectional view of the display device according to the example embodiment.
Figure 2B:
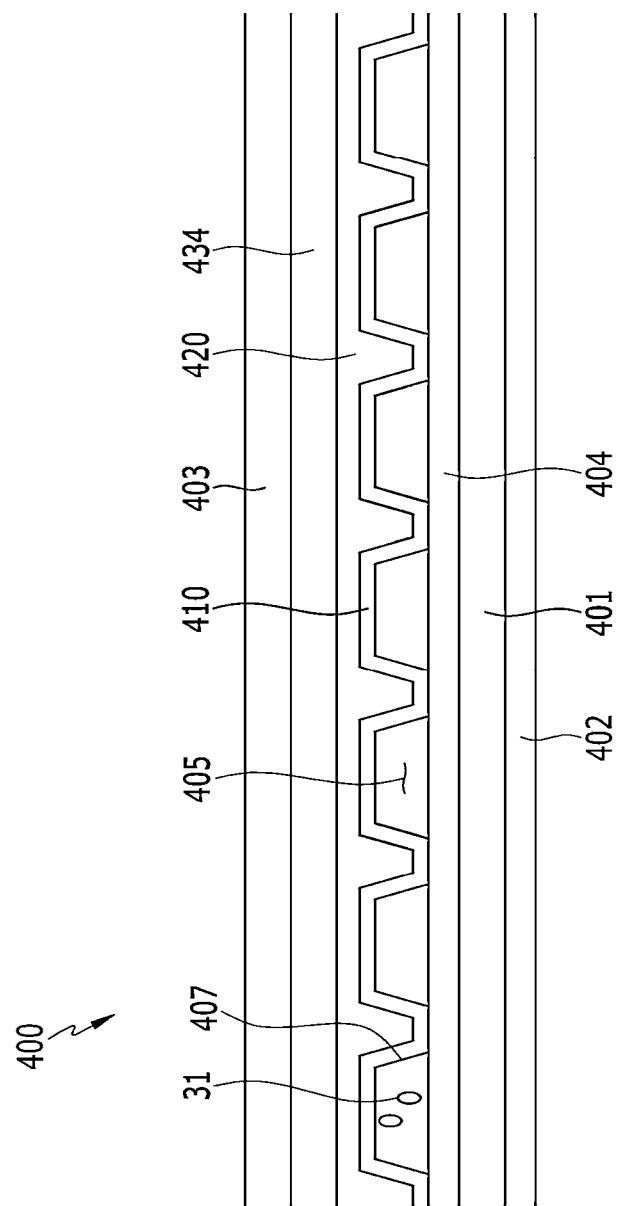
FIG. 2B is a cross-sectional view of a polarization conversion panel according to the example embodiment.

FIG. 1 is an exploded perspective view schematically showing a display device according to an example embodiment, FIG. 2A is a partial cross-sectional view of the display device according to the example embodiment, and FIG. 2B is a cross-sectional view of a polarization conversion panel according to the example embodiment.

Referring to FIG. 1, the display device according to the example embodiment includes a display panel 100, a polarization conversion panel 400, and a window 10.

The window 10 is positioned in front of the display panel 100 to protect it.

The window 10 protects the display panel from being broken by external impact.

The window 10 may be attached to the display panel 100 or the polarization conversion panel 400 by a predetermined adhesive layer (not shown).

Alternatively, the display panel 100 or the polarization conversion panel 400 may be formed so as to be spaced apart from the window 10 with an air layer interposed therebetween.

The display panel 100 may include a liquid crystal array panel 101 and polarizers 120, 130 positioned at opposite sides of the liquid crystal array panel 101.

In the present disclosure, a liquid crystal display panel in which the liquid crystal array panel 101 generates a vertical electric field is described, but it is not limited thereto. Alternatively, the display panel may be a display device such as a plasma display panel (PDP), an organic light emitting diode (OLED) display device, a surface conduction electron-emitter display (SED), a field emission display (FED), a vacuum fluorescent display (VFD), an e-paper, etc.

A first polarizer 120 and a second polarizer 130 may be positioned on opposite sides of the liquid crystal array panel 101 so as to polarize light incident from a light unit (not shown).

Particularly, a transmissive axis of the first polarizer 120 positioned between the polarization conversion panel 400 and the liquid crystal array panel 101 coincides with a transmissive axis of a reflective polarizer 403 that the polarization conversion panel 400 includes.

In order for the image displayed on the liquid crystal array panel 101 to be transmitted to a user through the reflective polarizer 403, the transmissive axes of the reflective polarizer 403 and the first polarizer 120 should be parallel to each other.

In addition, when the liquid crystal array panel 101 is used as the display panel according to an example embodiment, the display device may further include the light unit (not shown) in addition to the first and second polarizers 120 and 130.

The light unit includes a light source that emits light, and a light guide plate (not shown) for guiding the received light toward the display panel 100 and the polarization conversion panel 400.

As an example of the present invention, the light source may include at least one light emitting diode (LED), which may be disposed on at least one lateral side of the light guide plate.

That is, the light source may be an edge-type light unit positioned at the lateral sides of the light guide.

However, the light unit is not limited thereto, and it may have a direct-type structure in which the light source is positioned directly under a diffusion plate (not shown), and the light source may consist of a fluorescent lamp instead of the light emitting diode (LED).

In the present disclosure, the liquid crystal display panel has been used as the display panel, but it is not limited thereto, and an organic light emitting diode display panel may be used, and in this case, the second polarizer 130 and the light unit (not shown) may be omitted.

The polarization conversion panel 400 will now be described in more detail with reference to FIGS. 2A and 2B.

The display panel illustrated in FIG. 2A together with the polarization conversion panel 400 will be described below in more detail.

FIG. 2A illustrates that the polarization conversion panel and the display panel are spaced apart from each other, but they can be combined by an adhesion member and the like.

Referring to FIG. 2B, the polarization conversion panel 400 reflects or transmits light depending on whether or not a voltage is applied thereto, and according to the example embodiment, the polarization conversion panel 400 is positioned between the window 10 and the display panel 100.

The polarization conversion panel 400 includes the reflective polarizer 403 positioned on the first polarizer 120 of the display panel 100, a second electrode 434 positioned on the reflective polarizer 403, a first electrode 404 that faces and is spaced apart from the second electrode 434, and an absorptive polarizer 402. A microcavity 405 injected with a liquid crystal layer containing liquid crystal molecules 31 and a plurality of passivation layers 410 may be positioned in a space between the second and first electrodes 434 and 404.

Alternatively, according to the present example embodiment, the absorptive polarizer 402 may be positioned on an insulation substrate 401.

This is for the polarization conversion panel 400 and the display panel to be separately manufactured and then combined.

The absorptive polarizer 402 is positioned on one surface of the insulation substrate 401.

The absorptive polarizer 402 has a predetermined transmissive axis, and the transmissive axis of the absorptive polarizer 402 may be perpendicular to or parallel to the transmissive axis of the reflective polarizer 403 depending on liquid crystal modes.

Accordingly, only light vibrating in a direction parallel to the transmissive axis of the absorptive polarizer 402 may pass through the absorptive polarizer 402, and the remainder of the light is absorbed by the absorptive polarizer 402.

The first electrode 404 is positioned on the other surface of the insulation substrate 401.

The first electrode 404 may be made of a transparent conductive oxide (TCO), and may have the same planar shape as the insulation substrate 401, but it is not limited thereto.

The second electrode 434 is formed on the first electrode 404 such that it is spaced apart therefrom.

Similar to the first electrode 404, the second electrode 434 may be made of a transparent conductive oxide (TCO), and may have a shape corresponding to the planar shape of the insulation substrate 401.

However, the second electrode is not limited to the material or shape described above.

A plurality of microcavities 405 as well as the passivation layer 410 and an overcoat 420 that are used to form the microcavities 405 are formed between the first and second electrodes 404 and 434.

That is, the microcavities 405 are enclosed by the first electrode 404, the second electrode 434, and the passivation layer 410.

A width and an area of the microcavity 405 may be variously changed depending on a size and resolution of the display device.

In other words, according to an example embodiment, the microcavity 405 may be formed of a plurality of passivation layers and/or overcoats.

In the present disclosure, as shown in FIG. 2A and FIG. 2B, the microcavity 405 that is formed by the passivation layer and the overcoat will be described.

The microcavities 405 are positioned on the insulation substrate 401 of the polarization conversion panel 400, and in particular, may be arranged in a matrix form.

In this case, a valley V that defines an independent microcavity may be positioned along the matrix direction.

The valleys V may be positioned along horizontal and vertical directions so as to define the microcavities 405 that are arranged in the matrix form.

The passivation layer 410 may be formed to cover all of the microcavities 405 and the first electrode 404.

In this case, an injection hole 407 is formed such that the passivation layer 410 is partially removed to expose constituent elements positioned under the passivation layer 410.

As an example, the passivation layer 410 may have a shape that extends in a column direction with respect to the insulation substrate 401, and may be removed from the valleys to correspond to the valleys that are formed in a row direction.

Though not separately illustrated in FIGS. 2A and 2B, a first valley V1 may be positioned to support the microcavity 405 while a second valley V2 may be removed to form the injection hole 407 through which liquid crystals are injected inside the microcavity 405. Each passivation layer 410 is formed to be separated from the substrate 401 between the valleys V of the microcavities 405 so as to form the microcavities 405.

Further, in the valleys V between the microcavities 405 adjacent in a column direction, each passivation layer 410 is formed to be attached to the substrate 401 or the first electrode 404 such that it covers both lateral sides of the microcavities 405.

As an example, the injection hole 407 may be formed to correspond to a region in which the valley V is positioned, but is not limited thereto, and it may be formed on a top surface of the microcavity.

A structure of the polarization inversion panel is described as an example, and it may be modified in various ways.

For example, an arrangement of the valleys V may be varied, and the passivation layer 410 may be formed such that it is separated from the substrate 401 between the valleys of the adjacent microcavities 405 and is attached to the substrate 401 or the first electrode 404 so as to cover both lateral sides of the microcavity 405.

The liquid crystal layer including the liquid crystal molecules 31 that are injected through the injection hole 407 is positioned in the microcavity 405.

The liquid crystal molecules 31 can be realigned by applying an electric field between the second and first electrode 434 and 404.

As a result, rotation and phase delay of incident light toward the polarization conversion panel 400 can be adjusted by controlling the electric field between the second and first electrodes 434 and 404 from 0 V to a predetermined voltage.

The overcoat 420 may be formed on the passivation layer 410.

The overcoat 420 is formed to cover the injection hole 407 through which the microcavity 405 is partially exposed.

That is, the overcoat 420 may seal the microcavity 405 such that the liquid crystal molecules 31 therein are not discharged to the outside.

Because the overcoat 420 contacts the liquid crystal molecules 31, the overcoat 420 may be preferably made of a material that is not reactive with the liquid crystal molecules 31.

For example, the overcoat 420 may be made of parylene and the like.

In the present disclosure, the overcoat 420 having a single layer has been illustrated, but it is not limited thereto, and it may consist of multiple layers such as a double layer or a triple layer structure.

The double layer structure consists of two layers that are respectively made of different materials.

The triple layer structure consists of three layers, and forming materials of adjacent layers are different from each other.

For example, the overcoat 420 may include a layer made of an organic insulating material and a layer made of an inorganic insulating material.

The second electrode 434 described above is positioned on the overcoat 420.

The reflective polarizer 403 is positioned on the second electrode 434.

The transmissive axis of reflective polarizer 403 is parallel to the transmissive axis of the first polarizer 120. The reflective axis of reflective polarizer 403 is in a direction perpendicular to the transmissive axis.

Light that vibrates in a direction parallel to the transmissive axis of the reflective polarizer 403 is transmitted, while light that vibrates in a direction perpendicular to the transmissive axis, that is, a direction parallel to the reflection axis, is reflected.

A reflective polarization film may be used as the reflective polarizer 403, and a dual brightness enhancement film (DBEF), a wire grid polarizer (WGP), or a $TiO_2$ multilayer film may be used, as an example, but it is not limited thereto.

The display panel 100 according to an example embodiment, except for the polarization conversion panel 400, will now be schematically described with reference to FIGS. 3 to 6.

Figure 3:
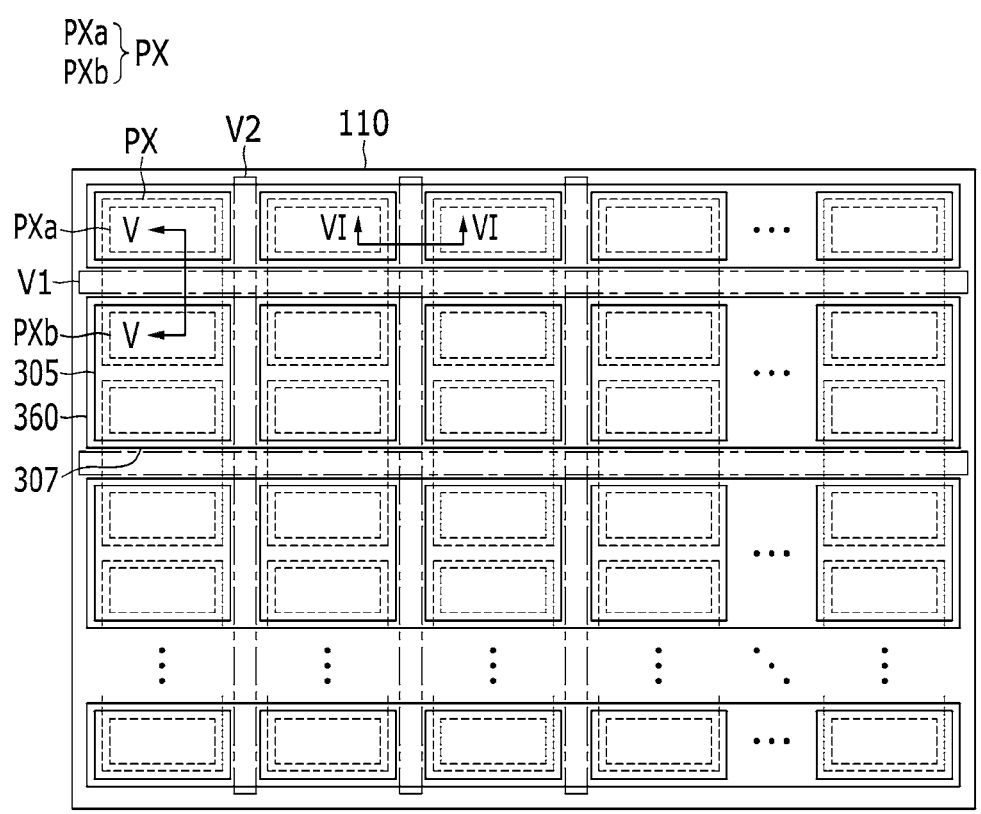
FIG. 3 is a top plan view of a display panel according to the example embodiment.

FIG. 3 is a top plan view of the display panel according to an example embodiment, and for convenience, some constituent elements are illustrated in FIG. 3.

The display panel according to an example embodiment includes a substrate 110 that is made of a material such as glass and plastic, with a roof layer 360 formed thereon.

The substrate 110 includes a plurality of pixel areas PX.

The plurality of pixel areas PX are disposed in a matrix form including a plurality of pixel rows and a plurality of pixel columns.

Each pixel area PX may include a first subpixel area PXa and a second subpixel area PXb.

The first and second subpixel areas PXa and PXb may be vertically disposed.

A first valley V1 is positioned between the first and second subpixel areas PXa and PXb along a pixel row direction, and a second valley V2 is positioned between a plurality of pixel columns.

This configuration is the same as that of the valleys V along the microcavities 405 of polarization conversion panel 400, and configurations for forming the microcavities 405 to be described later will also be the same.

The roof layer 360 is formed in a pixel row direction.

In this case, the injection hole 307 (FIG. 5) is formed by removing the roof layer 360 at the first valley V1 to expose a constituent elements positioned under the roof layer 360 to the outside.

Each roof layer 360 is formed so as to be separated from the substrate 110 between the adjacent second valleys V2 to form the microcavity 305.

Further, each roof layer 360 is formed such that it is attached to the substrate 110 at the second valley V2 to cover both lateral sides of the microcavity 305.

A structure of the display device according to an example embodiment described above is an example, and may be variously modified.

For example, an arrangement of the pixel area PX, the first valley V1, and the second valley V2 may be modified, a plurality of roof layers 360 may be connected to each other at the first valley V1, and a part of each roof layer 360 may be formed to be separated from the substrate 110 at the second valley V2 such that the adjacent microcavities 305 can be connected to each other.

In addition, the microcavity 305 and the constituent elements related thereto that are described in the display panel 100 may also be applied to the polarization conversion panel 400.

Next, referring to FIGS. 4 to 6, one pixel of the display device according to an example embodiment will be described as follows.

Figure 4:
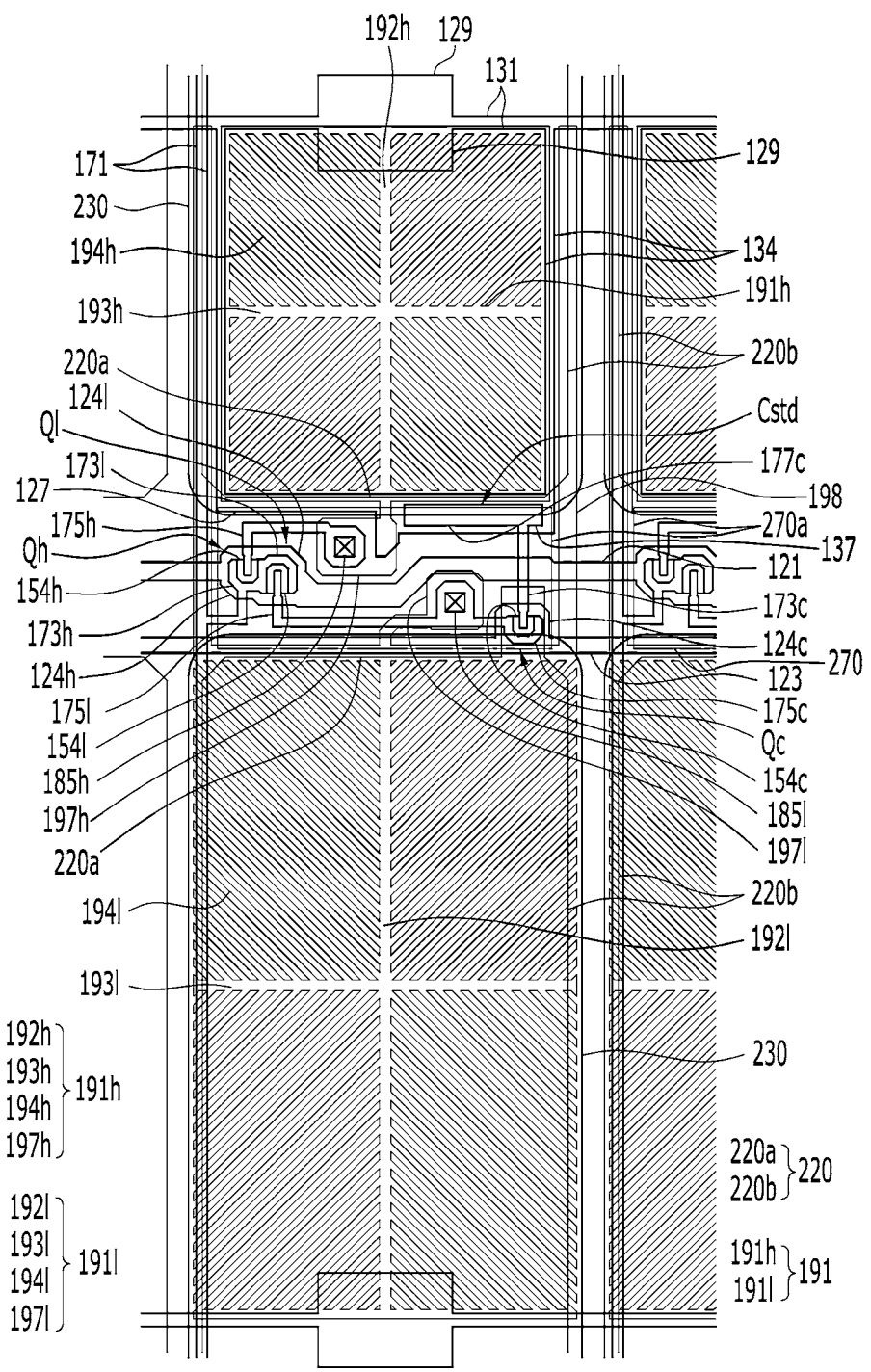
FIG. 4 is a top plan view of one pixel of the display panel according to the example embodiment.
Figure 5:
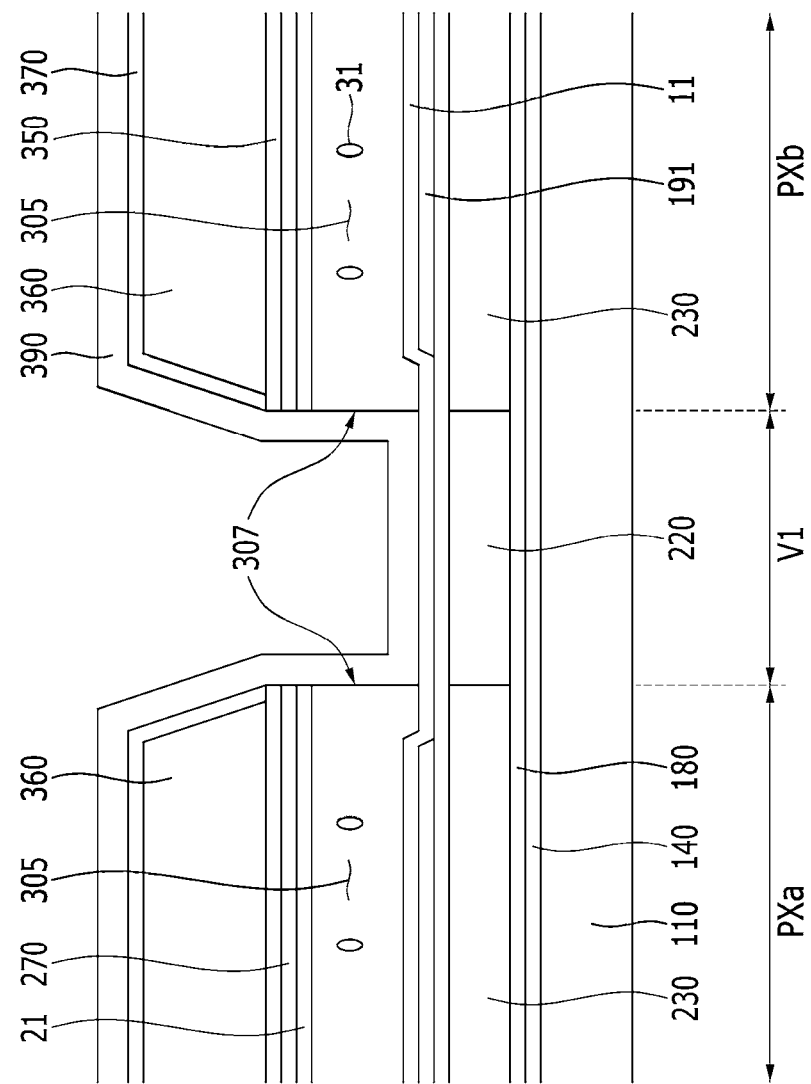
FIG. 5 is a partial cross-sectional view of the display panel according to the example embodiment taken along the line V-V of FIG. 3.
Figure 6:
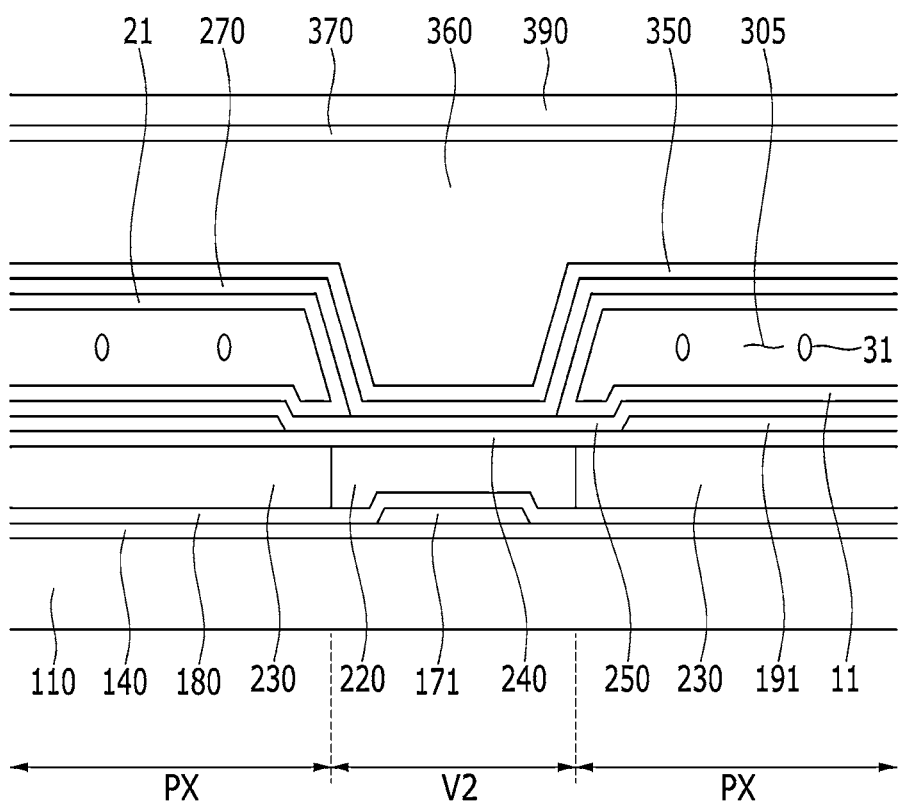
FIG. 6 is a partial cross-sectional view of the display panel according to the example embodiment taken along the line VI-VI of FIG. 3.

FIG. 4 is a top plan view of one pixel of the display panel according to the example embodiment, FIG. 5 is a partial cross-sectional view of the display panel according to the example embodiment taken along the line V-V of FIG. 3, and FIG. 6 is a partial cross-sectional view of the display panel according to the example embodiment taken along the line VI-VI of FIG. 3.

Referring to FIGS. 3 to 6, a plurality of gate conductors including a plurality of gate lines 121, a plurality of step-down gate lines 123, and a plurality of storage electrode lines 131 are formed on the substrate 110.

The gate line 121 and the step-down gate line 123 mainly extend in a horizontal direction to transmit gate signals.

The gate conductor further includes a first gate electrode 124h and a second gate electrode 124I that protrude upward and downward from the gate line 121, and a third gate electrode 124c protruding upward from the step-down gate line 123.

The first gate electrode 124h and the second gate electrode 124I are connected with each other to form one protruding portion.

In this case, protruding shapes of the first, second, and third gate electrodes 124h, 124l, and 124c may be modified.

The storage electrode line 131 mainly extends in a horizontal direction to transmit a predetermined voltage such as a common voltage Vcom.

The storage electrode line 131 includes a storage electrode 129 protruding upward and downward, a pair of vertical portions 134 extending downward to be substantially perpendicular to the gate line 121, and a horizontal portion 127 connecting ends of the pair of vertical portions 134.

The horizontal portion 127 includes a capacitor electrode 137 expanded downward.

A gate insulating layer 140 is formed on the gate conductors 121, 123, 124h, 124l, 124c, and 131.

The gate insulating layer 140 may be made of an inorganic insulating material such as a silicon nitride ($SiN_x$), a silicon oxide ($SiO_x$), etc.

Further, the gate insulating layer 140 may consist of a single layer or multiple layers.

A first semiconductor 154h, a second semiconductor 154l, and a third semiconductor 154c are formed on the gate insulating layer 140.

The first semiconductor 154h may be positioned on the first gate electrode 124h, the second semiconductor 154l may be positioned on the second gate electrode 124I, and the third semiconductor 154c may be positioned on the third gate electrode 124c.

The first and second semiconductors 154h and 154l may be connected to each other, and the second and third semiconductors 154l and 154c may be connected to each other.

Further, the first semiconductor 154h may be formed to extend below the data line 171.

The first to third semiconductors 154h, 154l, and 154c may be made of amorphous silicon, polycrystalline silicon, a metallic oxide, etc.

Ohmic contacts (not shown) may be further formed on the first to third semiconductors 154h, 154l, and 154c, respectively.

The ohmic contacts may be made of a silicide or a material such as n+ hydrogenated amorphous silicon in which n-type impurities are highly doped.

A data conductor including a data line 171, a first source electrode 173h, a second source electrode 173l, a third source electrode 173c, a first drain electrode 175h, a second drain electrode 175l, and a third drain electrode 175c is formed on the first to third semiconductors 154h, 154l, and 154c.

The data line 171 transmits a data signal and mainly extends in a vertical direction to cross the gate line 121 and the step-down gate line 123.

Each data line 171 includes the first source electrode 173h and the second source electrode 173l that extend toward the first gate electrode 124h and the second gate electrode 124l, and are connected to each other.

The first drain electrode 175h, the second drain electrode 175l, and the third drain electrode 175c include one wide end portions and the other rod-shaped end portions, respectively. The rod-shaped end portions of the first and second drain electrodes 175h and 175l are partially surrounded by the first and second source electrodes 173h and 173l.

One wide end portion of the second drain electrode 175l further extends to form the third source electrode 173c that is bent in a "U" shape.

A wide end portion 177c of the third drain electrode 175c overlaps the capacitor electrode 137 to form a step-down capacitor Cstd, and the rod-shaped end portion thereof is partially surrounded by the third source electrode 173c.

The first gate electrode 124h, the first source electrode 173h, and the first drain electrode 175h form a first thin film transistor Qh together with the first semiconductor 154h.

The second gate electrode 124I, the second source electrode 173I, and the second drain electrode 175I form a second thin film transistor QI together with the second semiconductor 154I. The third gate electrode 124c, the third source electrode 173c and the third drain electrode 175c form the third thin film transistor Qc together with the third semiconductor 154c.

The first semiconductor 154h, the second semiconductor 154I, and the third semiconductor 154c are connected to each other to be linearly formed, and may have substantially the same planar shape as the data conductors 171, 173h, 173I, 173c, 175h, 175I, and 175c and the ohmic contacts therebelow, except for channel regions between the source electrodes 173h, 173I, and 173c and the drain electrodes 175h, 173I, and 175c.

In the first semiconductor 154h, an exposed portion that is not covered by the first source electrode 173h and the first drain electrode 175h is disposed between the first source electrode 173h and the first drain electrode 175h. In the second semiconductor 154I, an exposed portion that is not covered by the second source electrode 173I and the second drain electrode 175I is disposed between the second source electrode 173I and the second drain electrode 175I. In the third semiconductor 154c, an exposed portion that is not covered by the third source electrode 173c and the third drain electrode 175c is disposed between the third source electrode 173c and the third drain electrode 175c.

A passivation layer 180 is formed on the data conductors 171, 173h, 173I, 173c, 175h, 175l, and 175c and exposed portions of the semiconductors 154h, 154l, and 154c between the respective source electrodes 173h, 173l, 173c and the respective drain electrodes 175h, 175l, 175c.

The passivation layer 180 may be made of an organic insulating material or an inorganic insulating material, and may be formed as a single layer or multiple layers.

A color filter 230 in each pixel area PX is formed on the passivation layer 180.

Each color filter 230 may display one of the primary colors such as red, green, and blue.

The color filter 230 is not limited to the three primary colors of red, green, and blue, but may display one of cyan, magenta, yellow, and white-based colors.

Unlike what is illustrated above, the color filter 230 may further extend in a column direction along the adjacent data lines 171.

A light blocking member 220 is formed in a region between the adjacent color filters 230.

The light blocking member 220 is formed on a boundary of the pixel area PX and the thin film transistor to prevent light leakage.

The color filter 230 is formed in each of the first subpixel area PXa and the second subpixel area PXb, and the light blocking member 220 may be formed between the first subpixel area PXa and the second subpixel area PXb.

The light blocking member 220 extends along the gate line 121 and the step-down gate line 123 such that it expands upward and downward, and includes a horizontal light blocking member 220a that covers regions in which the first thin film transistor Qh, the second thin film transistor QI, and the third thin film transistor Qc are positioned, and a vertical light blocking member 220b that extends along the data line 171.

That is, the horizontal light blocking member 220a may be formed at a position that corresponds to the position of the first valley V1 (FIG. 5), and the vertical light blocking member 220b may be formed at a position that corresponds to the position of the second valley V2 (FIG. 6).

The color filter 230 and the light blocking member 220 may overlap each other in some regions.

A first insulating layer 240 may be further formed on the color filter 230 and the light blocking member 220.

The first insulating layer 240 may be made of an inorganic insulating material such as a silicon nitride ($SiN_x$), a silicon oxide ($SiO_x$), and a silicon oxynitride ($SiO_xN_y$).

The first insulating layer 240 serves to protect the color filter 230 and the light blocking member 220 that are made of an organic material, and may be omitted if necessary.

The first insulating layer 240, the light blocking member 220, and the passivation layer 180 are formed with a plurality of first contact holes 185h and a plurality of second contact holes 185l that respectively expose the wide end portion of the first drain electrode 175h and the wide end portion of the second drain electrode 175l.

A pixel electrode 191 is formed on the first insulating layer 240.

The pixel electrode 191 may be made of a transparent metallic material such as indium tin oxide (ITO), indium zinc oxide (IZO), etc.

The pixel electrode 191 is divided while interposing the gate line 121 and the step-down gate line 123 into a first subpixel electrode 191h and a second subpixel electrode 191l that are disposed at upper and lower parts of the pixel area based on the gate line 121 and the step-down gate line 123, and are adjacent to each other in a column direction.

That is, the first and second subpixel electrodes 191h and 191l are separated from each other while interposing the first valley V1 therebetween, the first subpixel electrode 191h is positioned in the first subpixel area PXa, and the second subpixel electrode 191l is positioned in the second subpixel area PXb.

The first and second subpixel electrodes 191h and 191l are connected to the first and drain electrodes 175h and 175l through the first and second contact holes 185h and 185l, respectively.

Accordingly, when the first and second thin film transistors Qh and Ql are turned on, the first and second thin film transistors Qh and Ql are applied with data voltages from the first and second drain electrodes 175h and 175l.

Each of the first and second subpixel electrodes 191h and 191l roughly has a quadrangular shape, and the first and second subpixel electrodes 191h and 191l include a cross-shaped stem portion consisting of horizontal stem portions 193h and 193l and vertical stem portions 192h and 192l that cross the horizontal stem portions 193h and 193l, respectively.

In addition, the first and second subpixel electrodes 191h and 191l include a plurality of micro branch portions 194h and 194l, and protruding portions 197h and 197l protruding downward or upward from edge sides of the first and second subpixel electrodes 191h and 191l, respectively.

The subpixel electrodes 191h and 191l are divided into four subregions by the horizontal stem portions 193h and 193l and the vertical stem portions 192h and 192l.

The micro branch portions 194h and 194l obliquely extend from the horizontal stem portions 193h and 193l and the vertical stem portions 192h and 192l, and may form an angle of about 45 to 135 degrees with respect to the gate line 121 or the horizontal stem portions 193h and 193l in their extending direction.

Further, directions in which the micro branch portions 194h and 194l of the two adjacent subregions extend may be perpendicular to each other.

In the present example embodiment, the first subpixel electrode 191h further includes an outer stem portion surrounding its periphery, and the second subpixel electrode 191l includes horizontal portions positioned at upper and lower ends, and left and right vertical portions 198 positioned at left and right sides of the first subpixel electrode 191h.

The left and right vertical portions 198 may prevent capacitive coupling between the data line 171 and the first subpixel electrode 191h.

The arrangement of the pixel area, the structure of the thin film transistor, and the shape of the pixel electrode that are described above are examples, and the present invention is not limited thereto, but may be variously modified.

Referring to FIGS. 5 and 6, a common electrode 270 is formed on the pixel electrode 191 such that it is spaced apart from the pixel electrode 191 by a predetermined distance.

A microcavity (display microcavity) 305 is formed between the pixel electrode 191 and the common electrode 270.

That is, the microcavity 305 is surrounded by the pixel electrode 191 and the common electrode 270.

A width and an area of the microcavity 305 may be variously modified according to a size and resolution of the display device.

The common electrode 270 may be made of a transparent metallic material such as indium tin oxide (ITO), indium zinc oxide (IZO), etc.

The common electrode 270 may be applied with a predetermined voltage, and an electric field may be generated between the pixel electrode 191 and the common electrode 270.

A first alignment layer 11 is formed on the pixel electrode 191.

The first alignment layer 11 may also be formed directly on the first insulating layer 240 that is not covered by the pixel electrode 191.

A second alignment layer 21 is formed under the common electrode 270 to face the first alignment layer 11.

The first and second alignment layers 11 and 21 may be formed in a vertical alignment layer, and may be made of an alignment material such as polyamic acid, polysiloxane, polyimide, etc.

The first and second alignment layers 11 and 21 may be connected to each other at edges of the pixel area PX.

A liquid crystal layer formed by liquid crystal molecules 31 is formed in the microcavity 305 that is positioned between the pixel electrode 191 and the common electrode 270.

The liquid crystal molecules 31 have negative dielectric anisotropy, and may be erected in a direction perpendicular to the substrate 110 when no electric field is applied.

That is, vertical alignment may be realized.

The first and second subpixel electrodes 191h and 191l to which the data voltages are applied generate the electric field together with the common electrode 270 to determine directions of the liquid crystal molecules 31 that are positioned in the microcavity 305 between the two electrodes 191 and 270.

As such, luminance of light passing through the liquid crystal layer varies according to the determined directions of the liquid crystal molecules 31.

A second insulating layer 350 may be further formed on the common electrode 270.

The second insulating layer 350 may be made of an inorganic insulating material such as a silicon nitride ($SiN_x$), a silicon oxide ($SiO_x$), a silicon oxynitride ($SiO_xN_y$), etc., and may be omitted if necessary.

A roof layer 360 is formed on the second insulating layer 350.

The roof layer 360 may be made of an organic material.

The microcavity 305 is formed below the roof layer 360, and the roof layer 360 may be hardened by a hardening process to maintain the shape of the microcavity 305.

That is, the roof layer 360 is formed to be spaced apart from the pixel electrode 191 while interposing the microcavity 305 therebetween.

The roof layer 360 is formed in each pixel area PX and in the second valley V2 along a pixel row, and is not formed in the first valley V1.

That is, the roof layer 360 is not formed between the first and second subpixel areas PXa and PXb.

The microcavity 305 is formed below each roof layer 360 in the first and second subpixel areas PXa and PXb.

In the second valley V2, the microcavity 305 is not formed below the roof layer 360, but is formed to be attached to the substrate 110.

Accordingly, the roof layer 360 positioned at the second valley V2 may be formed to have a greater thickness than the roof layer 360 positioned in each of the first and second subpixel areas PXa and PXb.

A top surface and both lateral sides of the microcavity 305 is formed such that they are covered with the roof layer 360.

An injection hole 307 that partially exposes the microcavity 305 is formed in the common electrode 270, the second insulating layer 350, and the roof layer 360.

The injection holes 307 may be formed so as to face each other at edges of the first subpixel area PXa and the second subpixel area PXb.

That is, the injection holes 307 may be formed such that they correspond to a lower side of the first subpixel area PXa and an upper side of the second subpixel area PXb so as to expose lateral sides of the microcavity 305.

Because the microcavity 305 is exposed by the injection hole 307, an aligning agent or a liquid crystal material may be injected into the microcavity 305 through the injection hole 307.

An overcoat 390 may be formed on a third insulating layer 370.

The overcoat 390 is formed to cover the injection hole 307 through which the microcavity 305 is partially exposed to the exterior of the microcavity 305.

That is, the overcoat 390 may seal the microcavity 305 such that the liquid crystal molecules 31 formed in the microcavity 305 are not discharged outside of the microcavity 305.

Because the overcoat 390 contacts the liquid crystal molecules 31, the overcoat 390 may be made of a material that is not reactive with the liquid crystal molecules 31.

For example, the overcoat 390 may be made of parylene and the like.

The overcoat 390 may consist of multiple layers, such as a double layer and a triple layer structure.

The double layer structure consists of two layers that are made of different materials.

The triple layer structure consists of three layers, and materials of adjacent layers are different from each other.

For example, the overcoat 390 may include a layer that is made of an organic insulating material and a layer that is made of an inorganic insulating material.

As shown in FIG. 1, polarizers (first polarizer 120 and a second polarizer 130) may be further formed on upper and lower sides of the display device.

The polarizers may consist of a first polarizer 120 and a second polarizer 130.

The first polarizer 120 may be attached to a lower side of the substrate 110, while the second polarizer 130 may be attached to the overcoat 390.

The display device including the display panel 101 (FIG. 1) and the polarization conversion panel 400 (FIG. 1) that are described above may reduce the number of substrates used, thereby reducing the thickness and weight of the display device.

Further, improved touch sensing is provided to the display device having an additional touch panel.

Next, a manufacturing method of a display device according to an example embodiment will be described as follows.

Referring to FIGS. 4, 5 and 6, first, a gate line 121 and a step-down gate line 123 that extend in one direction are formed on a substrate 110 that is made of glass or plastic, and a first gate electrode 124$h$, a second gate electrode 124$l$, and a third gate electrode 124$c$ that protrude from the gate line 121 are formed.

Further, a storage electrode line 131 may be integrally formed such that it is spaced apart from the gate line 121, the step-down gate line 123, and the first to third gate electrodes 124$h$, 124$l$, and 124$c$.

Next, a gate insulating layer 140 is formed on the entire surface of the substrate 110 including the gate line 121, the step-down gate line 123, and first to third gate electrodes 124$h$, 124$l$, and 124$c$, and the storage electrode line 131, by using an inorganic insulating material such as a silicon nitride ($SiN_x$) and a silicon oxide ($SiO_x$).

The gate insulating layer 140 may be formed with a single layer or multiple layers.

Next, a first semiconductor 154$h$, a second semiconductor 154$l$, and a third semiconductor 154$c$ are formed by depositing a semiconductor material such as amorphous silicon, polycrystalline silicon, and a metallic oxide on the gate insulating layer 140 and then patterning the deposited semiconductor material.

The first semiconductor 154$h$ may be positioned on the first gate electrode 124$h$, the second semiconductor 154$l$ may be positioned on the second gate electrode 124I, and the third semiconductor 154$c$ may be positioned on the third gate electrode 124$c$.

Next, a data line 171 that extends in the other direction is formed by depositing the metallic material and then patterning the deposited metallic material.

The metallic material may consist of a single layer or multiple layers.

Further, a first source electrode 173$h$ protruding above the first gate electrode 124$h$ from the data line 171 and a first drain electrode 175$h$ spaced apart from the first source electrode 173$h$ are integrally formed.

Further, a second source electrode 173$l$ connected to the first source electrode 173$h$ and a second drain electrode 175$l$ spaced apart from the second source electrode 173$l$ are integrally formed.

Further, a third source electrode 173$c$ extending from the second drain electrode 175$l$ and a third drain electrode 175$c$ spaced apart from the third source electrode 173$c$ are integrally formed.

After being consecutively deposited, the semiconductor material and the metallic material may be simultaneously patterned to form the first to third semiconductors 154$h$, 154$l$, and 154$c$, the data line 171, the first to third source electrodes 173$h$, 173$l$, and 173$c$, and the first to third drain electrodes 175$h$, 175$l$, and 175$c$.

In this case, the first semiconductor 154$h$ may be formed to extend below the data line 171.

The first, second, and third gate electrodes 124h, 124l, and 124c, the first, second, and third source electrodes 173h, 173l, and 173c, and the first, second, and third drain electrodes 175h, 175l, and 175c form first, second, and third thin film transistors (TFTs) Qh, Ql, and Qc together with the first, second, and third semiconductors 154h, 154l, and 154c, respectively.

Subsequently, a passivation layer 180 is formed on the data line 171, the first to third source electrodes 173h, 173l, and 173c, the first to third drain electrodes 175h, 175l, and 175c, and exposed portions of the semiconductors 154h, 154l, and 154c between the source electrodes 173h, 173l, and 173c and the drain electrodes 175h, 175l, and 175c.

The passivation layer 180 may be made of an organic insulating material or an inorganic insulating material, and may be formed with a single layer or multiple layers.

Next, a color filter 230 is formed in each pixel area PX on the passivation layer 180.

The color filter 230 is formed in each of the first subpixel area PXa and the second subpixel area PXb, and may not be formed at the first valley V1.

Further, the color filters 230 having the same color may be formed along a column direction of the plurality of pixel areas PX.

In case of forming the color filters 230 of three colors, a color filter 230 of a first color may be formed first and then a color filter 230 of a second color may be formed by shifting a mask.

Next, after forming the color filter 230 of the second color, a color filter 230 of a third color may be formed by shifting the mask.

Next, a light blocking member 220 is formed on a boundary of each pixel area PX on the passivation layer 180 and the thin film transistor.

The light blocking member 220 may be formed at the first valley V1 that is positioned between the first and second subpixel areas PXa and PXb.

In the above description, the light blocking member 220 is formed after forming the color filters 230, but the present disclosure is not limited thereto, and the light blocking member 220 may be formed first and then the color filters 230 may be formed.

Next, a first insulating layer 240 made of an inorganic insulating material such as a silicon nitride (SiN$_x$), a silicon oxide (SiO$_x$), a silicon oxynitride (SiO$_x$N$_y$), etc. is formed on the color filter 230 and the light blocking member 220.

Next, a first contact hole 185h is formed by etching the passivation layer 180, the light blocking member 220, and the first insulating layer 240 such that it partially exposes the first drain electrode 175h, and a second contact hole 185l is formed such that it partially exposes the second drain electrode 175l.

Next, a first subpixel electrode 191h and a second subpixel electrode 191l are respectively formed in the first and second subpixel areas PXa and PXb by depositing and then patterning a transparent metallic material such as indium tin oxide (ITO) and indium zinc oxide (IZO) on the first insulating layer 240.

The first and second subpixel electrodes 191h and 191l are separated from each other while interposing the first valley V1 therebetween.

The first subpixel electrode 191h is formed to be connected to the first drain electrode 175h through the first contact hole 185h, and the second subpixel electrode 191l is formed to be connected to the second drain electrode 175l through the second contact hole 185l.

Horizontal stem portions 193h and 193l and vertical stem portions 192h and 192l crossing the horizontal stem portions 193h and 193l are respectively formed in the first and second subpixel electrodes 191h and 191l.

Further, a plurality of micro branch portions 194h and 194l, which obliquely extend from the horizontal stem portions 193h and 193l and the vertical stem portions 192h and 192l, are formed.

A photosensitive organic material is coated on the pixel electrode, and then a photolithography process is performed to form a sacrificial layer (not shown).

The sacrificial layers (not shown) are formed to be connected to each other along the plurality of pixel columns.

That is, the sacrificial layer (not shown) is formed to cover each pixel area PX and the first valley V1 that is positioned between the first and second subpixel areas
PXa and PXb.

Subsequently, a common electrode 270 is formed by depositing a transparent metallic material such as indium tin oxide (ITO) and indium zinc oxide (IZO) on the sacrificial layer (not shown).

Next, a second insulating layer 350 may be formed on the common electrode 270 by using an inorganic insulating material such as a silicon nitride (SiN$_x$), a silicon oxide (SiO$_x$), a silicon oxynitride (SiO$_x$N$_y$), etc.

Next, an organic material is coated and then patterned on the second insulating layer 350 to form a roof layer 360.

In this case, the patterning may be performed to remove the organic material positioned at the first valley V1.

Accordingly, the roof layers 360 may be formed to be connected to each other along a plurality of pixel rows.

The sacrificial layer (not shown) is completely removed by supplying a developer and a stripper solution on the substrate 110 where the sacrificial layer (not shown) is exposed, or by an ashing process.

When the sacrificial layer (not shown) is removed, the microcavity 305 is created at a position where the sacrificial layer (not shown) is positioned.

The pixel electrode 191 and the common electrode 270 are spaced apart from each other while interposing the microcavity 305 therebetween, and the pixel electrode 191 and the roof layer 360 are spaced apart from each other while interposing the microcavity 305 therebetween.

The common electrode 270 and the roof layer 360 are formed to cover a top surface and both lateral sides of the microcavity 305.

The microcavity 305 is exposed outside through a portion where the roof layer 360, the second insulation layer 350, and the common electrode 270 are removed, which is the injection hole 307.

The injection hole 307 may be formed along the first valley V1.

For example, injection holes 307 may be formed to face each other at edges of the first and second subpixel areas PXa and PXb.

That is, the injection hole 307 may be formed such that it corresponds to a lower side of the first subpixel area PXa and an upper side of the second subpixel area PXb so as to expose lateral sides of the microcavity 305.

Alternatively, the injection hole 307 may be formed along the second valley V2.

Next, the roof layer 360 is hardened by applying heat to the substrate 110.

This is to maintain a shape of the microcavity 305 by the roof layer 360.

Next, when an aligning agent containing an alignment material is dripped on the substrate 110 by a spin coating method or an inkjet method, the aligning agent is injected into the microcavity 305 through the injection hole 307.

When the aligning agent is injected into the microcavity 305 and then a hardening process is performed, a solution component is evaporated and the alignment material remains at an inner wall of the microcavity 305.

Accordingly, the first alignment layer 11 may be formed on the pixel electrode 191, and the second alignment layer 21 may be formed below the common electrode 270.

The first and second alignment layers 11 and 21 are formed to face each other while interposing the microcavity 305 therebetween, and are connected to each other at the edges of the pixel area PX.

In this case, the first and second alignment layers 11 and 21 may be aligned in a direction that is perpendicular to the substrate 110 except at the lateral sides of the microcavity 305.

In addition, by performing a process of irradiating ultraviolet rays to the first and second alignment layers 11 and 21, the alignment layers 11 and 21 may be aligned in a direction parallel to the substrate 110.

Next, when the liquid crystal material formed by liquid crystal molecules 31 is dripped on the substrate 110 by an inkjet method or a dispensing method, the liquid crystal material is injected into the microcavity 305 through the injection hole 307.

In this case, the liquid crystal material may be dropped in the injection holes 307 that are formed along the odd-numbered first valleys V1, and may not be dripped in the injection holes 307 that are formed along the even-numbered first valleys V1.

Alternatively, the liquid crystal material may be dripped in the injection holes 307 that are formed along the even-numbered first valleys V1, and may not be dripped in the injection holes 307 formed along the odd-numbered first valleys V1.

When the liquid crystal material is dripped in the injection holes 307 that are formed along the odd-numbered first valleys V1, the liquid crystal material passes through the injection hole 307 by capillary force such that it is placed inside the microcavity 305.

In this case, because air inside the microcavity 305 is discharged through the injection holes 307 that that are formed along the even-numbered first valleys V1, the liquid crystal material enters into the microcavity 305.

Further, the liquid crystal material may be dripped in all of the injection holes 307.

That is, the liquid crystal material may be dripped in all of the injection holes 307 that are formed along the odd-numbered first valleys V1 and the even-numbered first valleys V1.

An overcoat 390 is formed by depositing a material that is not reactive with the liquid crystal molecules 31 on the third insulating layer 370.

The overcoat 390 is formed such that it covers the injection hole 307 where the microcavity 305 is exposed outside and seals the microcavity 305.

Next, though not illustrated in FIGS. 5 and 6, additional polarizers may be attached to the upper and lower sides of the display device.

The polarizers may consist of a first polarizer 120 and a second polarizer 130 (FIG. 1).

The second polarizer 130 may be attached to a bottom surface of the substrate 110, while first polarizer 120 may be attached on the overcoat 390.

A manufacturing method of a polarization conversion panel 400 will now be described with reference to FIGS. 7 to 9.

Figure 7:
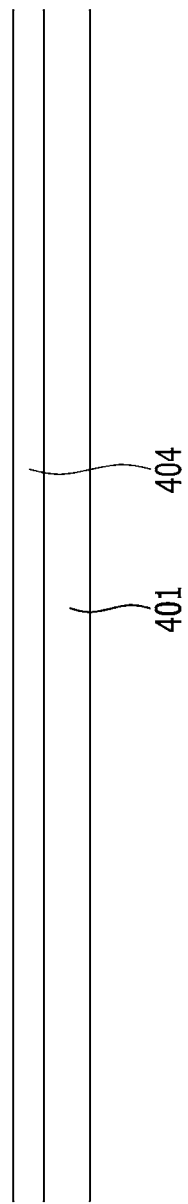
FIGS. 7 to 9 are cross-sectional views of a polarization conversion panel according to a manufacturing method thereof.

First, as shown in FIG. 7, a first electrode 404 is formed by depositing a transparent metallic material such as indium tin oxide (ITO) and indium zinc oxide (IZO) on one surface of an insulation substrate 401.

Figure 8:
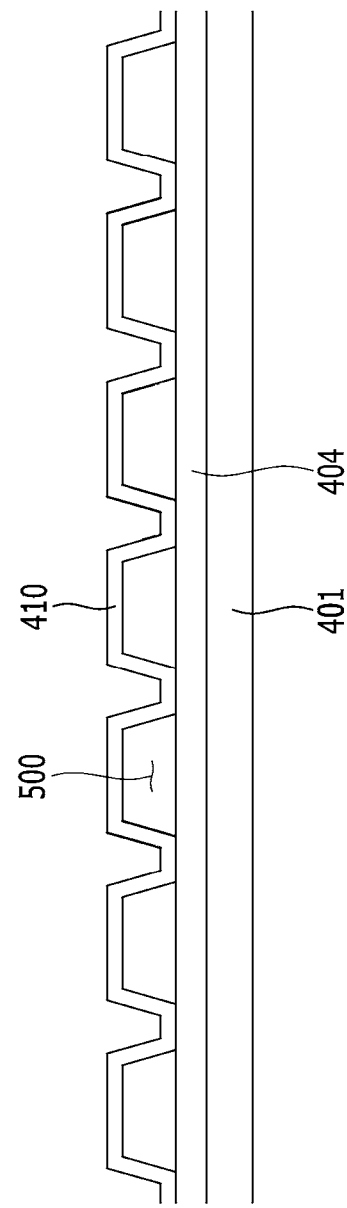

Next, as shown in FIG. 8, a photosensitive organic material is coated on the first electrode 404, and then a photolithography process is performed to form a sacrificial layer 500.

As shown in FIG. 3, the sacrificial layer 500 is formed in a matrix form consisting of a plurality of islands.

Next, a passivation layer 410 is formed on the sacrificial layer 500 by using an inorganic insulating material such as a silicon nitride ($SiN_x$), a silicon oxide ($SiO_x$), a silicon oxynitride ($SiO_xN_y$), etc.

Next, by partially etching the passivation layer 410, the sacrificial layer is exposed, and the sacrificial layer 500 can be completely removed by supplying a developer and a stripper solution on the substrate 401 where the sacrificial layer is exposed, or by an ashing process.

When the sacrificial layer is removed, the microcavity 405 is created at a position where the sacrificial layer is positioned.

The microcavity 405 is exposed to the exterior of the polarization conversion panel through a portion where the passivation layer 410 is removed, which is the injection hole 407. Next, the substrate 401 may be heated to harden the passivation layer 410.

This is to maintain the shape of the microcavity 405 by the passivation layer 410.

Next, when an aligning agent containing an alignment material is dripped on the substrate 401 by a spin coating method or an inkjet method, the aligning agent is injected into the microcavity 405 through the injection hole 407.

When the aligning agent is injected into the microcavity 405 and then a hardening process is performed, a solution component is evaporated and the alignment material remains at an inner wall of the microcavity 405.

Thus, an alignment layer (not shown) may be formed on the first electrode 404, and another alignment layer (not shown) may be formed below the passivation layer 410.

The alignment layers may be formed to face each other while interposing the microcavity 405 therebetween.

In this case, the alignment layers may be aligned in a direction perpendicular to the substrate 401 except at the lateral sides of the microcavity 405.

In addition, by performing a process of irradiating ultraviolet rays to the alignment layers, the alignment layers may be aligned in a direction parallel to the substrate 401.

In the present disclosure, the example embodiment in which the alignment layers are formed by a UV irradiation process has been described, but it is not limited thereto, and the alignment layers may be formed by a photo-alignment process.

Next, when the liquid crystal material consisting of the liquid crystal molecules 31 is dripped on the substrate 401 by an inkjet method or a dispensing method, the liquid crystal material is injected into the microcavity 405 through the injection holes 407.

When the liquid crystal material is dripped in the injection holes 407, the liquid crystal material passes through the injection hole 407 by capillary force such that it is placed inside the microcavity 405.

In this case, because air inside the microcavity 405 is discharged through the injection holes 407 that are formed along the even-numbered valleys V, the liquid crystal material enters into the microcavity 405.

Further, the liquid crystal material may be dripped in all of the injection holes 407.

That is, the liquid crystal material may be dripped in all of the injection holes 407 that are formed along the odd-numbered valleys V and the even-numbered valleys V.

Figure 9:
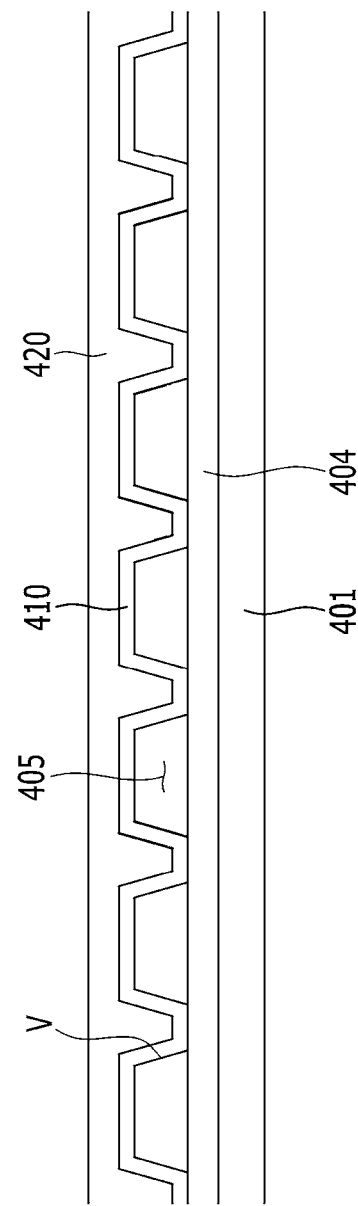

Next, as shown in FIG. 9, an overcoat 420 is formed by depositing a material that is not reactive with the liquid crystal molecules 31 on the passivation layer 410.

The overcoat 420 is formed such that it covers the injection hole 407 where the microcavity 405 is exposed outside and seals the microcavity 405.

Next, a second electrode 434 (FIG. 2A) is formed by depositing a transparent metallic material such as indium tin oxide (ITO) and indium zinc oxide (IZO) on the overcoat 420.

Next, the polarization conversion panel 400 illustrated in FIG. 2A can be manufactured by positioning the reflective polarizer 403 on the second electrode 434 and the absorptive polarizer 402 on the other side of the insulation substrate 401 formed before.

The display device including the polarization conversion panel manufactured as such may reduce the width and weight of the device because it requires fewer substrates, and the polarization conversion panel and the display panel may be bonded to each other to improve weakness that each panel has.

A driving mechanism of a polarization conversion panel according to an example embodiment will now be described with reference to FIGS. 10 and 11.

Figure 10:
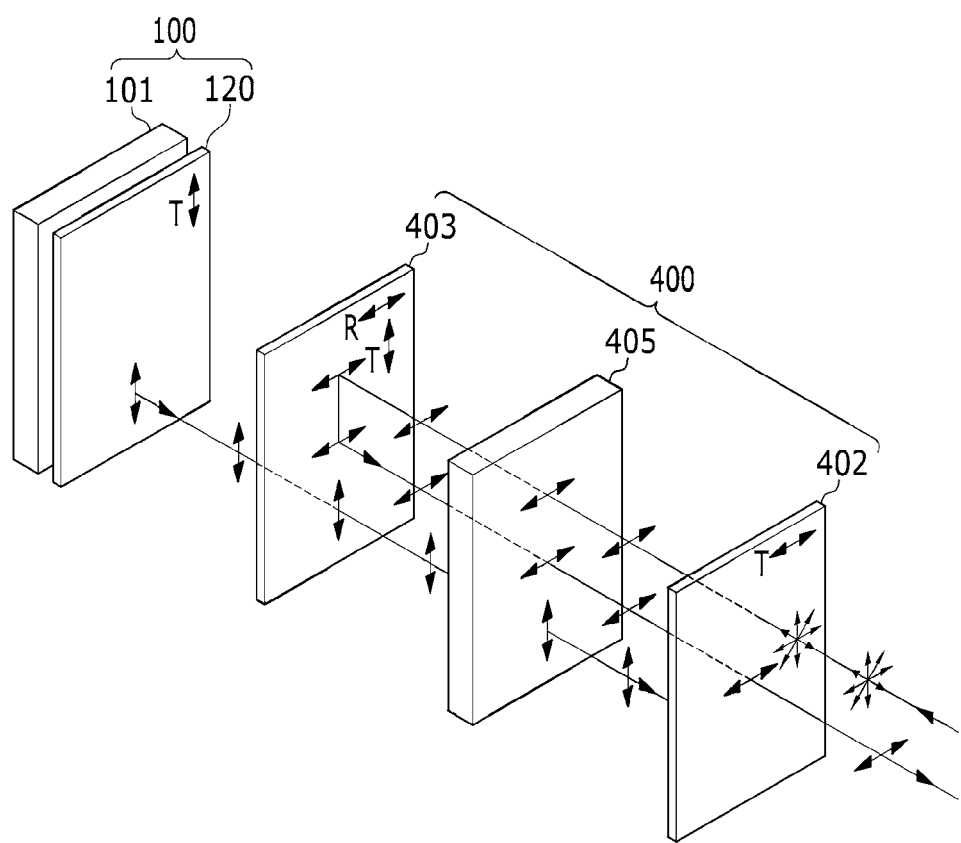
FIGS. 10 and 11 are schematic views showing how a mirror mode is implemented according to the example embodiment of the present invention.
Figure 11:
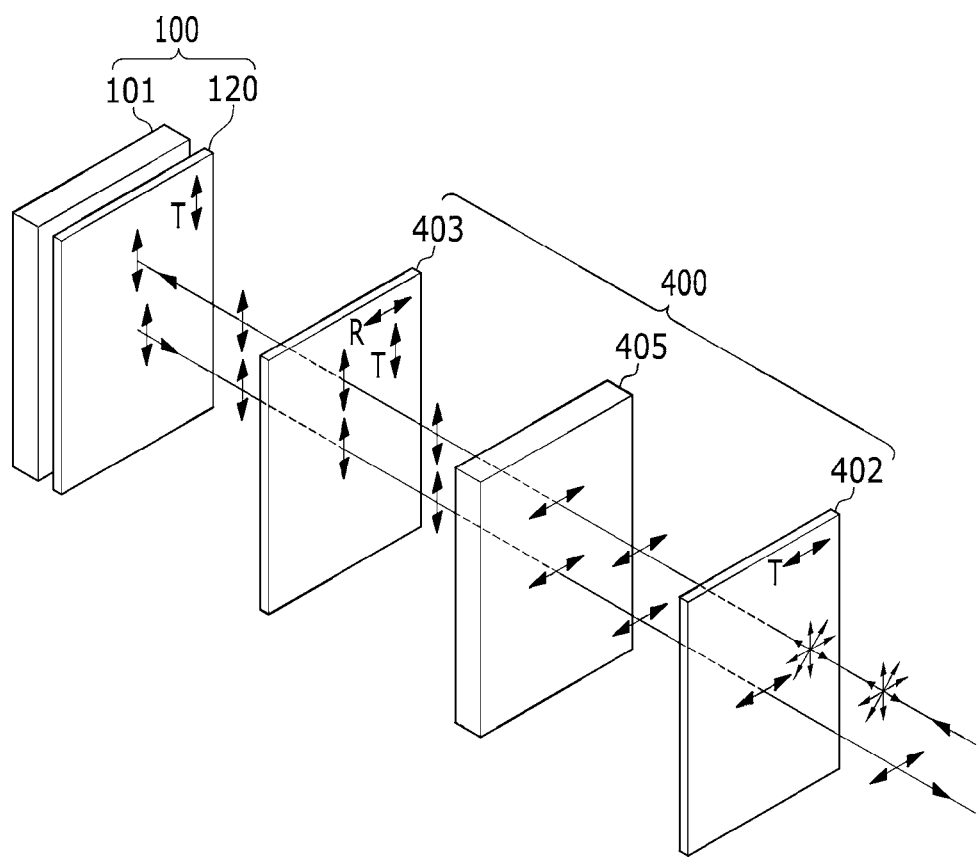

FIG. 10 shows a driving mechanism of the polarization conversion panel according to an example embodiment to which no voltage is applied, and FIG. 11 shows a driving mechanism of the polarization conversion panel according to an example embodiment to which a voltage is applied.

According to the polarization conversion panel illustrated in FIGS. 10 and 11, liquid crystals are in a vertically aligned ("VA") mode, transmissive axes of a first polarizer 120 and a reflective polarizer 403 are parallel to each other, and the transmissive axis of the reflective polarizer 403 is perpendicular to a transmissive axis of the absorptive polarizer 402.

In addition, the liquid crystals of the VA mode have been described, but they are not limited thereto, and the liquid crystals of an OCB (optically compensated ben) mode or a PLS (plane to line switching) mode may also be included.

FIG. 10 shows how the light is transmitted when the voltage is applied, while FIG. 11 shows how the light is transmitted when no voltage is applied.

Next, referring to FIG. 10, a case in which no voltage is applied to the polarization conversion panel will be described.

Incident light from the outside has polarization axes in all directions, but only light with its polarization axis in one direction passes through the absorptive polarizer 402 while the remainder of the light is absorbed by the absorptive polarizer 402.

As an example, the light in the horizontal direction is transmitted.

The light desired to have a predetermined polarization axis passes through the polarization conversion panel in the VA mode that is applied with the voltage while maintaining its polarization axis.

As an example embodiment, the polarization axes of the reflective polarizer 403 and the absorptive polarizer 402 are perpendicular to each other, while the transmissive and reflection axes of the reflective polarizer 403 are perpendicular to each other.

The transmissive and reflective axes of the reflective polarizer 403 are respectively in the vertical and horizontal directions such that the light having its polarization axis in the horizontal direction is completely reflected because its polarization axis is in parallel with the reflective axis of the reflective polarizer 403.

Such a transmittance property is equally applied to the light that is emitted outside after being reflected from the reflective polarizer 403.

The light reflected from the reflective polarizer 403 maintains its current polarization axis while passing through the polarization conversion panel 400, and thus is transmitted therethrough as its polarization axis is parallel to the transmissive axis of the absorptive polarizer 402.

As described above, because the light incident upon the display device is reflected from the reflective polarizer 403 when no voltage is applied to the polarization conversion panel and is then incident to a user's eyes, the display device provides a mirror function.

Next, referring to FIG. 11, a case in which voltage is applied to the polarization conversion panel will be described.

First, among incident light from the outside, only the light having the same polarization axis as the transmissive axis of the absorptive polarizer 402 passes through the absorptive polarizer 402, and the remainder of the light is absorbed by the absorptive polarizer 402.

Referring to FIG. 11, as an example, only the light having the transmissive axis in the horizontal direction is transmitted.

The polarization axis of the light that is polarized by the absorptive polarizer 402 in one direction is rotated by 90 degrees while passing through the liquid crystals of the VA mode to which the voltage is applied.

The light with its polarization axis rotated by 90 degrees has a vertical polarization axis.

The light having the vertical polarization axis has the polarization axis parallel to the transmissive axis of the reflective polarizer 403 such that it is completely transmitted therethrough.

Such light transmission is equally applied to the light emitting out of the display panel 100.

The light polarized by the display panel 100 and the first polarizer 120 has a polarization axis parallel to the transmissive axis of the first polarizer 120.

The transmissive axes of the first polarizer 120 and the reflective polarizer 403 are parallel to each other such that the light transmitted through the first polarizer 120 also passes through the reflective polarizer 403.

Next, the light transmitted through the liquid crystals of the VA mode to which the voltage is applied has its polarization axis rotated by 90 degrees.

Thus, the incident light having the vertical polarization axis is emitted outside such that it has the horizontal polarization axis.

Because the transmissive axes of the reflective polarizer 403 and the absorptive polarizer 402 are perpendicular to each other, the light having the horizontal polarization axis passes through the absorptive polarizer 402 because its polarization axis is parallel to the transmissive axis of the absorptive polarizer 402.

Thus, the light emitting out of the display panel 100 displays the image without having additional polarization conversion when the voltage is applied to the polarization conversion panel 400.

A display device according to an example embodiment will now be described with reference to FIGS. 12 and 13.

Figure 12:
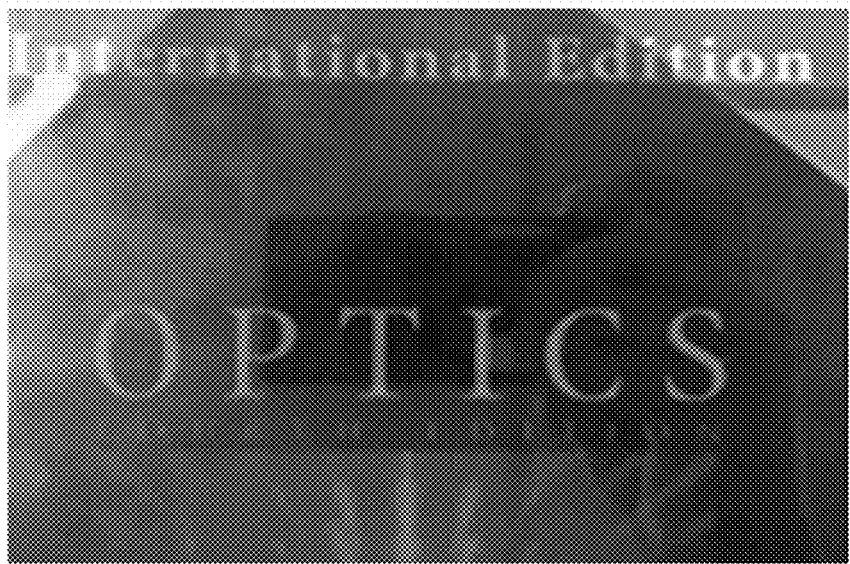
FIGS. 12 and 13 are images of the display device according to the example embodiment.
Figure 13:

FIG. 12 is an image showing a mode of the display device in which a display image is shown, and FIG. 13 is an image of the display device operated in a mirror mode with no voltage applied to the polarization conversion panel.

FIG. 12 is a case in which the voltage is applied to the conversion panel according to the example embodiment and the display panel displays an outputted image.

In the present disclosure, as an example, a printed material is placed under the polarization conversion panel such that it is seen by a user's eyes.

When the display panel is positioned at a position where the printed material is placed, the user's eyes may recognize the image that the display panel outputs.

Referring to FIG. 13, which is a case in which no voltage is applied according to an example embodiment, and as a result, the polarization conversion panel provides a reflective mode in which the mirror function is implemented.

That is, according to the aforementioned principle, the polarization conversion panel 400 including the liquid crystals of the VA mode liquid crystals may provide a mode in which it displays an image when the voltage is applied and operating as a mirror when no voltage is applied Accordingly, the display device according to example embodiments has an advantage of having reduced thickness and weight as well as implementing the mirror and display mode.

While example embodiments have been described in connection with what is presently considered to be practical example embodiments, it is to be understood that the invention is not limited to the disclosed embodiments, but, on the contrary, is intended to cover various modifications and equivalent arrangements included within the spirit and scope of the disclosure, including the appended claims.

<Description of Symbols>

| | |
|---|---|
| 100: display panel | 400: polarization conversion panel |
| 401: insulation substrate | 402: absorptive polarizer |
| 404: first electrode | 304, 405: microcavity |
| 307, 407: injection hole | 180, 410: passivation layer |
| 390, 420: overcoat | 434: second electrode |
| 403: reflective polarizer | |

What is claimed is:

1. A display device comprising:
a display panel; and
a polarization conversion panel facing the display panel, wherein
the polarization conversion panel includes:
an insulation substrate;
an absorptive polarizer positioned on the insulation substrate;
a first electrode positioned on the absorptive polarizer;
a passivation layer formed on the first electrode while being spaced apart therefrom and a microcavity interposed between the passivation layer and the first electrode, the passivation layer including an injection hole;
an overcoat formed on the passivation layer to cover the injection hole and seal the microcavity;
a second electrode positioned on the overcoat;
a reflective polarizer positioned on the second electrode; and
a liquid crystal layer positioned in the microcavity.

2. The display device of claim 1, wherein
the display panel contacts the reflective polarizer.

3. The display device of claim 1, wherein
the first and second electrodes are made of a transparent conductive oxide (TCO).

4. The display device of claim 1, wherein
a first polarizer positioned between the display panel and the reflective polarizer is further included, and
transmissive axes of the first polarizer and the reflective polarizer coincide with each other.

5. The display device of claim 4, wherein
the transmissive axis of the reflective polarizer is perpendicular to a transmissive axis of the absorptive polarizer.

6. The display device of claim 4, wherein
a reflective axis of the reflective polarizer is parallel to the transmissive axis of the absorptive polarizer.

7. The display device of claim 4, wherein
the transmissive and reflective axes of the reflective polarizer are perpendicular to each other.

8. The display device of claim 1, wherein
the display panel includes:
a substrate including a plurality of pixel areas that are arranged in a matrix form including a plurality of pixel rows and pixel columns;
a thin film transistor formed on the substrate;
a pixel electrode formed in the pixel area while being connected to the thin film transistor;
a roof layer formed on the pixel electrode while being spaced apart therefrom and interposing a display microcavity therebetween;
a liquid crystal layer filling the display microcavity; and
an overcoat formed on the roof layer to cover the first injection hole and seal the display microcavity.

* * * * *